United States Patent
Kwak et al.

(10) Patent No.: US 12,126,019 B2
(45) Date of Patent: Oct. 22, 2024

(54) METHOD OF PREPARING POSITIVE ELECTRODE ACTIVE MATERIAL

(71) Applicant: LG Chem, Ltd., Seoul (KR)

(72) Inventors: Ick Soon Kwak, Daejeon (KR); Chang Wan Chae, Daejeon (KR); Sang Soon Choi, Daejeon (KR); Hwa Seok Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 8 days.

(21) Appl. No.: 17/799,752

(22) PCT Filed: Jun. 14, 2021

(86) PCT No.: PCT/KR2021/007370
§ 371 (c)(1),
(2) Date: Aug. 15, 2022

(87) PCT Pub. No.: WO2021/256794
PCT Pub. Date: Dec. 23, 2021

(65) Prior Publication Data
US 2023/0083070 A1    Mar. 16, 2023

(30) Foreign Application Priority Data
Jun. 15, 2020    (KR) .................. 10-2020-0072105

(51) Int. Cl.
*H01M 4/525*      (2010.01)
*C01G 53/00*      (2006.01)
*H01M 4/02*       (2006.01)
*H01M 4/04*       (2006.01)
*H01M 4/505*      (2010.01)

(52) U.S. Cl.
CPC ............ *H01M 4/525* (2013.01); *C01G 53/50* (2013.01); *H01M 4/0471* (2013.01); *H01M 4/505* (2013.01); *C01P 2002/52* (2013.01); *C01P 2004/84* (2013.01); *C01P 2006/40* (2013.01); *H01M 2004/028* (2013.01)

(58) Field of Classification Search
CPC .... H01M 4/525; H01M 4/0471; H01M 4/505; H01M 2004/028; C01G 53/50; C01G 53/44; C01P 2002/52; C01P 2004/84; C01P 2006/40; C01P 2006/80; C01P 2004/61; Y02E 60/10; Y02T 10/62
See application file for complete search history.

(56) References Cited

U.S. PATENT DOCUMENTS

| | | |
|---|---|---|
| 2014/0193714 A1 | 7/2014 | Kim et al. |
| 2018/0040890 A1 | 2/2018 | Choi et al. |
| 2018/0294477 A1 | 10/2018 | Shin et al. |
| 2019/0300382 A1 | 10/2019 | Kim et al. |
| 2019/0341599 A1 | 11/2019 | Lee et al. |
| 2019/0372115 A1 | 12/2019 | Shin et al. |
| 2020/0313194 A1 | 10/2020 | Baek et al. |
| 2020/0350554 A1 | 11/2020 | Choi et al. |
| 2020/0350555 A1 | 11/2020 | Park et al. |
| 2021/0028445 A1 | 1/2021 | Jung et al. |
| 2021/0036317 A1 | 2/2021 | Choi et al. |
| 2022/0052331 A1 | 2/2022 | Lho et al. |
| 2022/0185691 A1 | 6/2022 | Kim et al. |
| 2022/0302429 A1 | 9/2022 | Park et al. |

FOREIGN PATENT DOCUMENTS

| | | | |
|---|---|---|---|
| CN | 105514409 A | 4/2016 | |
| CN | 109728262 A * | 5/2019 | |
| CN | 110422890 A | 11/2019 | |
| CN | 110650922 A | 1/2020 | |
| CN | 111201200 A | 5/2020 | |
| JP | 6407754 B2 | 10/2018 | |
| KR | 20090104700 A | 10/2009 | |
| KR | 20140089851 A | 7/2014 | |
| KR | 20170063396 A | 6/2017 | |
| KR | 20180015044 A * | 2/2018 | ............ C01G 53/42 |
| KR | 20180073293 A | 7/2018 | |
| KR | 20180077026 A | 7/2018 | |
| KR | 20190007801 A | 1/2019 | |
| KR | 20190060705 A | 6/2019 | |
| KR | 20190119442 A | 10/2019 | |
| KR | 20190129615 A | 11/2019 | |

(Continued)

OTHER PUBLICATIONS

English Translation of CN109728262 (Year: 2019).*
English Translation of KR20180015044A (Year: 2018).*
International Search Report for Application No. PCT/KR2021/007370 mailed Sep. 17, 2021, pp. 1-3.
Search Report dated May 29, 2023 from Office Action for Chinese Application No. 202180013597.1 issued May 30, 2023. 3 pgs. (see p. 2-3, categorizing the cited references).

(Continued)

*Primary Examiner* — Andrew J. Oyer
(74) *Attorney, Agent, or Firm* — Lerner David LLP

(57) ABSTRACT

A method of preparing a positive electrode active material is disclosed herein. In some embodiments, the method includes firing a first mixture at 400° C. to 700° C. to prepare a primary firing product, wherein the first mixture has a positive electrode active material precursor having a specific composition, a first lithium-containing source material, and optionally, an aluminum-containing source material, and firing a second mixture at a temperature above the firing temperature of the first mixture to prepare a positive electrode active material, wherein the second mixture has the primary firing product, a second lithium-containing source material, and a specific doping element $M^1$-containing source material. The method is capable of degrading the cake strength of a primary firing product and providing a positive electrode active material having excellent quality by dividing a firing process into two steps.

13 Claims, No Drawings

(56) References Cited

FOREIGN PATENT DOCUMENTS

| KR | 20200036424 A | 4/2020 |
|---|---|---|
| KR | 20200065626 A | 6/2020 |
| WO | 2019-194609 A1 | 10/2019 |

OTHER PUBLICATIONS

Extended European Search Report for Application No. 21826917.3 dated Jul. 17, 2023. 7 pgs.

\* cited by examiner

METHOD OF PREPARING POSITIVE ELECTRODE ACTIVE MATERIAL

CROSS-REFERENCE TO RELATED APPLICATION

This application is a national phase entry under 35 U.S.C. § 371 of International Application No. PCT/KR2021/007370, filed Jun. 14, 2021, which claims priority from Korean Patent Application No. 10-2020-0072105, filed on Jun. 15, 2020, the disclosures of which are incorporated by reference herein.

TECHNICAL FIELD

The present invention relates to a method of preparing a positive electrode active material. Specifically, the present invention relates to a method of preparing a positive electrode active material, which is capable of enhancing productivity and providing a positive electrode active material having excellent quality by dividing a firing process into two steps, performing primary firing at a low temperature, and adding a doping element $M^1$-containing source material in secondary firing.

BACKGROUND ART

A conventional firing process for preparing a positive electrode active material is generally a one-step high-temperature firing process and consists of a series of processes of increasing, maintaining, and decreasing a temperature for firing. A positive electrode active material is prepared through post-treatment (pulverization, classification, deironization, and the like) after the one-step firing.

A positive electrode active material cake prepared according to the conventional method, that is, a preparation method including a high-temperature firing process, has high hardness. Accordingly, a load is excessively applied to equipment during the post-treatment, and thus the process risk such as productivity degradation, quality deviation, and the like is very high.

In addition, in terms of productivity, the amount of positive electrode active material that can be prepared per hour is very limited, and problems in equipment frequently arise, leading to very low productivity.

Therefore, there is a need for a method of preparing a positive electrode active material, which is capable of providing a positive electrode active material having excellent quality and improving productivity.

DISCLOSURE

Technical Problem

The present invention is directed to providing a method of preparing a positive electrode active material, which is capable of degrading the cake strength of a primary firing product to allow a pulverization process to readily proceed and thus providing a positive electrode active material having excellent quality and improving productivity by dividing a firing process into two steps, performing primary firing at a low temperature, and adding a doping element $M^1$-containing source material in secondary firing in the preparation of a positive electrode active material.

Technical Solution

One aspect of the present invention provides a method of preparing a positive electrode active material, which includes: a first step of mixing a positive electrode active material precursor having a composition represented by the following Chemical Formula 1 or Chemical Formula 2, a first lithium-containing source material, and optionally, an aluminum-containing source material, performing primary firing at 400° C. to 700° C. to prepare a primary firing product, and pulverizing the primary firing product; and a second step of mixing the pulverized primary firing product, a second lithium-containing source material, and a doping element $M^1$-containing source material and performing secondary firing at a temperature above the primary firing temperature to prepare a lithium transition metal oxide, wherein the doping element $M^1$-containing source material contains one or more metal elements selected from among Zr, Mg, Ti, Nb, W, Sc, Si, V, Fe, Y, and Mo.

[Chemical Formula 1]

[Chemical Formula 2]

In Chemical Formulas 1 and 2,
$0.6 \leq a < 1$, $0 < b < 0.4$, $0 < c < 0.4$, and $a+b+c=1$ are satisfied.

Advantageous Effects

According to the present invention, since a firing process is divided into two steps and primary firing is performed at a low temperature, the cake strength of a primary firing product can be degraded to allow a pulverization process to readily proceed, and thus productivity can be improved. Also, since a doping element $M^1$-containing source material is added in secondary firing, a positive electrode active material having excellent quality can be provided.

MODES OF THE INVENTION

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

It should be understood that the terms "comprises," "comprising," "includes," "including," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

Hereinafter, the present invention will be described in more detail.

Method of Preparing Positive Electrode Active Material

The inventors of the present invention have found that the cake strength of a primary firing product can be degraded to allow a pulverization process to readily proceed by dividing a firing process into two steps in the preparation of a positive electrode active material and performing primary firing at a low temperature, and thus productivity can be improved, and a positive electrode active material having excellent quality can be provided by adding a doping element $M^1$-containing source material in secondary firing, and completed the present invention based on this finding.

A method of preparing a positive electrode active material according to the present invention includes: a first step of mixing a positive electrode active material precursor having a composition represented by the following Chemical Formula 1 or 2, a first lithium-containing source material, and optionally, an aluminum-containing source material, performing primary firing at 400° C. to 700° C. to prepare a primary firing product, and pulverizing the primary firing product; and a second step of mixing the pulverized primary firing product, a second lithium-containing source material, and a doping element $M^1$-containing source material and performing secondary firing to prepare a lithium transition metal oxide.

$[Ni_aCo_bMn_c](OH)_2$ [Chemical Formula 1]

$[Ni_aCo_bMn_c]O \cdot OH$ [Chemical Formula 2]

In Chemical Formulas 1 and 2,
$0.6 \leq a<1$, $0<b<0.4$, $0<c<0.4$, and $a+b+c=1$ are satisfied.

Meanwhile, the doping element $M^1$-containing source material contains one or more metal elements selected from among Zr, Mg, Ti, Nb, W, Sc, Si, V, Fe, Y, and Mo.

The method of preparing a positive electrode active material according to the present invention may further include: a third step of rinsing the lithium transition metal oxide and performing drying; and a fourth step of mixing the dried lithium transition metal oxide with a coating element-containing source material and performing thermal treatment to form a coating layer.

Hereinafter, each step of the method of preparing a positive electrode active material will be described in detail.

First Step

The method of preparing a positive electrode active material according to the present invention includes a step of mixing a positive electrode active material precursor having a composition represented by the following Chemical Formula 1 or 2, a first lithium-containing source material, and optionally, an aluminum-containing source material, performing primary firing at 400° C. to 700° C. to prepare a primary firing product, and pulverizing the primary firing product.

$[Ni_aCo_bMn_c](OH)_2$ [Chemical Formula 1]

$[Ni_aCo_bMn_c]O \cdot OH$ [Chemical Formula 2]

In Chemical Formulas 1 and 2,
$0.6 \leq a<1$, $0<b<0.4$, $0<c<0.4$, and $a+b+c=1$ are satisfied.

a represents an atomic fraction of nickel of metal elements in the precursor, and $0.6 \leq a<1$, $0.6 \leq a \leq 0.98$, or $0.7 \leq a \leq 0.95$ may be satisfied. More specifically, a may satisfy $0.85 \leq a \leq 0.95$.

b represents an atomic fraction of cobalt of metal elements in the precursor, and $0<b<0.4$, $0.01 \leq b<0.4$, or $0.01 \leq b \leq 0.3$ may be satisfied. More specifically, b may satisfy $0.05 \leq b \leq 0.15$.

c represents an atomic fraction of manganese of metal elements in the precursor, and $0<c<0.4$, $0.01 \leq c<0.4$, or $0.01 \leq c \leq 0.3$ may be satisfied. More specifically, c may satisfy $0.05 \leq c \leq 0.15$.

According to the present invention, the first lithium-containing source material may include one or more selected from among lithium hydroxide hydrate ($LiOH \cdot H_2O$), lithium oxide ($Li_2O$), lithium peroxide ($Li_2O_2$), and lithium hydroxide anhydrate (LiOH). The first lithium-containing source material may specifically be lithium hydroxide hydrate. When the first lithium-containing source material is the above-described material, reactivity between a precursor with a high atomic fraction of nickel among metal elements and the first lithium-containing source material can be improved.

According to the present invention, the aluminum-containing source material may be optionally mixed, and when the aluminum-containing source material is mixed, the aluminum element contributes to structural stabilization of a positive electrode active material, and thus the lifespan of a battery can be improved.

Meanwhile, the aluminum-containing source material may be an aluminum-containing acetate, nitrate, sulfate, halide, sulfide, hydroxide, oxide, or oxyhydroxide. For example, the aluminum-containing source material may be $Al(OH)_3$.

In the preparation of a positive electrode active material, the positive electrode active material precursor and the lithium-containing source material (first lithium-containing source material+second lithium-containing source material) may be mixed in a molar ratio of 1:1 to 1:1.625 or 1:1 to 1:1.15. When the lithium-containing source material is mixed below the above-described proportion range, the capacity of the prepared positive electrode active material may be degraded. On the other hand, when the lithium-containing source material is mixed above the above-described proportion range, unreacted lithium may remain as a byproduct, and degradation of capacity and separation of positive electrode active material particles after firing (which causes a positive electrode active material to agglomerate) may occur.

According to the present invention, the first lithium-containing source material may be mixed in an amount of 70 mol % to 95 mol % with respect to the total number of moles of the first lithium-containing source material and the second lithium-containing source material. The content of the first lithium-containing source material may specifically be 80 mol % to 95 mol %, and more specifically, 90 mol % to 95 mol % with respect to the total number of moles of the first lithium-containing source material and the second lithium-containing source material. When the content of the first lithium-containing source material falls within the above-described range, the reactivity of a primary firing product prepared by primary firing can be enhanced, and thus the performance of a positive electrode active material can be improved.

According to the present invention, the primary firing may be performed at 400° C. to 700° C. When the primary firing temperature is below 400° C., reactivity between the positive electrode active material precursor and the first lithium-containing source material may be lowered to increase an amount of residual unreacted lithium, the design ratio of lithium and transition metals is changed as the residual unreacted lithium is separated in a subsequent process such that quality deviation is increased, and the capacity and lifespan of a battery may be degraded due to insufficient lithium in a positive electrode active material. On the other hand, when the primary firing temperature is above 700° C., over-firing locally occurs due to an inconsistent reaction, and thus the performance of a positive electrode active material may be degraded, leading to degradation of the capacity and lifespan of a battery.

The primary firing may be specifically performed at 500° C. to 700° C., and more specifically, 550° C. to 650° C.

When the primary firing temperature falls within the above-described range, the cake strength of a primary firing product is not high, and thus a pulverization process of pulverizing the primary firing product can readily proceed. Accordingly, a positive electrode active material having a uniform particle size distribution and improved tap density can be prepared. That is, a positive electrode active material prepared according to the present invention can exhibit excellent quality.

According to the present invention, the primary firing may be performed under an oxygen atmosphere in which an oxygen concentration is 80 wt % or more. The primary firing may be specifically performed under an oxygen atmosphere in which an oxygen concentration ranges from 80 wt % to 100 wt %, and more specifically, from 85 wt % to 100 wt %. In this case, reactivity between the positive electrode active material precursor and the first lithium-containing source material increases, and thus the amount of unreacted lithium remaining in the resulting positive electrode active material can be reduced.

According to the present invention, the primary firing may be performed for 8 hours to 12 hours. The primary firing may be specifically performed for 9 hours to 11 hours. When the primary firing time falls within the above-described range, production efficiency can be improved, and most of the positive electrode active material precursor and the first lithium-containing source material can react, resulting in a reduction of an amount of residual unreacted lithium.

According to the present invention, a primary firing product prepared by mixing the positive electrode active material precursor having a composition represented by Chemical Formula 1 or 2 and the first lithium-containing source material and performing primary firing at 400° C. to 700° C. may have a cake strength of 50 N or less. The cake strength of the primary firing product may specifically range from 10 N to 50 N, and more specifically, from 10 N to 30 N. When the cake strength of the primary firing product falls within the above-described range, the primary firing product is not hard, and thus a pulverization process of pulverizing the primary firing product can readily proceed. That is, a processing speed in the pulverization process can increase.

The preparation method according to the present invention includes a step of pulverizing the primary firing product. According to the present invention, a rotation speed of a pulverizer in the pulverization may range from 800 rpm to 3000 rpm. The rotation speed of a pulverizer may specifically be 800 rpm to 2000 rpm. When the rotation speed of a pulverizer falls within the above-described range, an increase in fine particles, which results from over-pulverization, can be suppressed, and the pulverized primary firing product can have a uniform particle size distribution.

The pulverized primary firing product may have an average particle diameter ($D_{50}$) of 8 μm to 15 μm. In this case, the density of an electrode mixture increases, and thus energy density per unit volume of an electrode can be enhanced.

Second Step

The method of preparing a positive electrode active material according to the present invention includes a step of mixing the pulverized primary firing product, a second lithium-containing source material, and a doping element $M^1$-containing source material and performing secondary firing to prepare a lithium transition metal oxide.

According to the present invention, the second lithium-containing source material may include one or more selected from among lithium hydroxide hydrate ($LiOH \cdot H_2O$), lithium oxide ($Li_2O$), lithium peroxide ($Li_2O_2$), and lithium hydroxide anhydrate (LiOH). The second lithium-containing source material may specifically be lithium hydroxide hydrate. When the second lithium-containing source material is the above-described material, reactivity between a precursor with a high atomic fraction of nickel among metal elements and the second lithium-containing source material can be improved.

According to the present invention, when the doping element $M^1$-containing source material is mixed, the doping element $M^1$ contributes to structural stabilization of a positive electrode active material, and thus the lifespan of a battery can be improved.

Meanwhile, since the doping element $M^1$-containing source material is mixed in the second step, not the first step, the performance of a positive electrode active material can be substantially improved, and as a result, the lifetime performance of a battery can be substantially improved.

When the doping element $M^1$-containing source material is mixed with a positive electrode active material precursor and a lithium-containing source material and then fired in the first step, reactivity between the positive electrode active material precursor and the lithium-containing source material is degraded. This is because, when $M^1$ is mixed in the first step, lithium and a doping element $M^1$ locally react to produce a compound $LiM^1O_x$, and thus a substitution reaction between the transition metal of the positive electrode active material precursor and the doping element $M^1$ does not occur well (doping does not occur well).

On the other hand, when the doping element $M^1$-containing source material is mixed with the pulverized primary firing product, which has enhanced reactivity compared to the lithium-containing source material and the positive electrode active material precursor, and then fired in the second step, a substitution reaction between the transition metal present in the pulverized primary firing product and the doping element $M^1$ occurs well.

The doping element $M^1$-containing source material may contain one or more metal elements selected from among Zr, Mg, Ti, Nb, W, Sc, Si, V, Fe, Y, and Mo, and specifically, one or more metal elements selected from among Zr, Mg, and Nb. In this case, a positive electrode active material may be structurally stabilized to enhance the lifespan of a battery.

The doping element $M^1$-containing source material may be an acetate, nitrate, sulfate, halide, sulfide, hydroxide, oxide, or oxyhydroxide which contains the metal element. For example, when the metal element is Zr, $ZrO_2$, $ZrSO_4$, or the like may be used.

According to the present invention, the second lithium-containing source material may be mixed in an amount of 5 mol % to 30 mol % with respect to the total number of moles of the first lithium-containing source material and the second lithium-containing source material. The content of the second lithium-containing source material may specifically be 5 mol % to 20 mol %, and more specifically, 5 mol % to 10 mol % with respect to the total number of moles of the first lithium-containing source material and the second lithium-containing source material. A case in which the content of the second lithium-containing source material falls within the above-described range is advantageous for enhancing the reactivity of lithium.

According to the present invention, the secondary firing may be performed at 700° C. to 1000° C. The secondary firing may be specifically performed at 700° C. to 900° C., and more specifically, 750° C. to 850° C. A case in which the secondary firing temperature falls within the above-described range is advantageous for controlling the size of positive electrode active material particles, ensuring stability, and improving a lithium-containing byproduct.

According to the present invention, the secondary firing may be performed under an oxygen atmosphere in which an oxygen concentration is 80 wt % or more. The secondary firing may be specifically performed under an oxygen atmosphere in which an oxygen concentration ranges from 80 wt % to 100 wt %, and more specifically, from 85 wt % to 100 wt %. In this case, reactivity between the pulverized primary firing product and the second lithium-containing source material increases, and thus the amount of unreacted lithium remaining in the resulting positive electrode active material can be reduced.

According to the present invention, the secondary firing may be performed for 8 hours to 12 hours. The secondary firing may be specifically performed for 9 hours to 11 hours. When the secondary firing time falls within the above-described range, production efficiency can be improved, and most of the pulverized primary firing product and the second lithium-containing source material can react, resulting in a reduction of an amount of residual unreacted lithium.

The lithium transition metal oxide prepared according to the present invention may be represented by the following Chemical Formula A.

[Chemical Formula A]

$M^1$ represents one or more selected from among Zr, Mg, Ti, Nb, W, Sc, Si, V, Fe, Y, and Mo, and $0 \leq x \leq 0.3$, $0.6 \leq a1 < 1.0$, $0 < b1 < 0.4$, $0 < c1 < 0.4$, $0 \leq d1 \leq 0.2$, $0 \leq e1 \leq 0.2$, and $a1+b1+c1+d1+e1=1$ are satisfied.

Third Step

The method of preparing a positive electrode active material according to the present invention may further include a step of rinsing the lithium transition metal oxide and performing drying. The rinsing is intended to remove impurities present on the surface of the lithium transition metal oxide with a rinsing solution.

A solvent of the rinsing solution may be one or more selected from among deionized water, distilled water, and ethanol. The solvent of the rinsing solution is preferably deionized water.

The rinsing process may be performed for 5 minutes to 30 minutes. When the rinsing time falls within the above-described range, a residual lithium byproduct present on the surface of the lithium transition metal oxide can be easily removed. Accordingly, a gelation phenomenon cannot occur in preparation of a positive electrode slurry, and gas cannot be generated in application to a battery. Also, lithium present inside the oxide is not discharged during the rinsing process, and thus battery performance cannot be degraded.

The drying process is intended to remove moisture from a moisture-containing positive electrode active material that has been subjected to the rinsing process and may be performed by removing moisture using a vacuum pump and performing drying at 100° C. to 300° C. for 12 hours or more.

Fourth Step

The method of preparing a positive electrode active material according to the present invention may further include a step of mixing the dried lithium transition metal oxide with a coating element-containing source material and performing thermally treatment to form a coating layer. Accordingly, a positive electrode active material in which a coating layer is formed on the surface of the lithium transition metal oxide may be prepared.

A metal element contained in the coating element-containing source material may be Zr, B, W, Mo, Cr, Nb, Mg, Hf, Ta, La, Ti, Sr, Ba, Ce, F, P, S, and Y. The coating element-containing source material may be an acetate, nitrate, sulfate, halide, sulfide, hydroxide, oxide, or oxyhydroxide which contains the metal element. For example, when the metal element is B, boric acid ($H_3BO_3$) or the like may be used.

The coating element-containing source material may be included in an amount of 200 ppm to 2000 ppm with respect to the weight of the dried lithium transition metal oxide. When the content of the coating element-containing source material falls within the above-described range, the capacity of a battery can be improved, and the formed coating layer can suppress a direct reaction between an electrolyte and the lithium transition metal oxide, resulting in an improvement of the long-term performance of a battery.

The thermal treatment may be performed at 200° C. to 400° C. When the thermal treatment temperature falls within the above-described range, a coating layer can be formed while maintaining the structural stability of the lithium transition metal oxide.

The thermal treatment may be performed for 1 hour to 10 hours. When the thermal treatment time falls within the above-described range, an appropriate coating layer can be formed, and production efficiency can be improved.

Positive Electrode

In addition, the present invention may provide a positive electrode for a lithium secondary battery, which includes a positive electrode active material prepared by the above-described method.

Specifically, the positive electrode includes a positive electrode current collector and a positive electrode active material layer formed on at least one surface of the positive electrode current collector and including the above-described positive electrode active material.

The positive electrode current collector is not particularly limited as long as it does not cause a chemical change in the battery and has conductivity. For example, stainless steel, aluminum, nickel, titanium, calcined carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

The positive electrode active material layer may include a conductive material and a binder in addition to the positive electrode active material.

The positive electrode active material may be included in an amount of 80 wt % to 99 wt %, and more specifically, 85 wt % to 98 wt % with respect to the total weight of the positive electrode active material layer. Within the above-described range, excellent capacity characteristics can be exhibited.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be included in an amount of 1 wt % to 30 wt % with respect to the total weight of the positive electrode active material layer.

The binder serves to improve cohesion between positive electrode active material particles and adhesion between the positive electrode active material and the current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluoro-rubber, and various copolymers thereof, which may be used alone or in combination of two or more thereof. The binder may be included in an amount of 1 wt % to 30 wt % with respect to the total weight of the positive electrode active material layer.

The positive electrode may be manufactured by a conventional method of manufacturing a positive electrode, except that the above-described positive electrode active material is used. Specifically, the positive electrode may be manufactured by applying a composition for forming a positive electrode active material layer, which is prepared by dissolving or dispersing the above-described positive electrode active material and, optionally, a binder and a conductive material in a solvent, onto a positive electrode current collector, followed by drying and roll pressing. In this case, the types and contents of the positive electrode active material, binder, and conductive material have been described above.

The solvent may be a solvent generally used in the art, and examples of the solvent include dimethyl sulfoxide (DMSO), isopropyl alcohol, N-methyl pyrrolidone (NMP), acetone, water, and the like, which may be used alone or in combination of two or more thereof. The solvent is used in an amount sufficient to dissolve or disperse the positive electrode active material, the conductive material, and the binder and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the composition for forming a positive electrode active material layer on a separate support and removing it from the support.

Lithium Secondary Battery

In Addition, the Present Invention May Provide an Electrochemical Device including the above-described positive electrode. The electrochemical device may specifically be a battery, a capacitor, or the like, and more specifically, a lithium secondary battery.

The lithium secondary battery specifically includes a positive electrode, a negative electrode disposed to face the positive electrode, a separator interposed between the positive electrode and the negative electrode, and an electrolyte. Since the positive electrode is the same as described above, the detailed description thereof will be omitted, and only the remaining components will be described in detail.

In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer formed on the negative electrode current collector.

The negative electrode current collector is not particularly limited as long as it does not cause a chemical change in the battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 µm to 500 µm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The negative electrode active material may be included in an amount of 80 wt % to 99 wt % with respect to the total weight of the negative electrode active material layer.

The binder serves to assist bonding between the conductive material, the active material, and the current collector and may be typically included in an amount of 0.1 wt % to 10 wt % with respect to the total weight of the negative electrode active material layer. Examples of the binder include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber, nitrile butadiene rubber, fluorine rubber, and various copolymers thereof.

The conductive material is a component for improving the conductivity of the negative electrode active material and may be included in an amount of 10 wt % or less, and preferably, 5 wt % or less with respect to the total weight of the negative electrode active material layer. Such a conductive material is not particularly limited as long as it does not cause a chemical change in the battery and has conductivity. For example, graphite such as natural graphite, artificial graphite, or the like; carbon black such as acetylene black, Ketjen black, channel black, furnace black, lamp black, thermal black, or the like; a conductive fiber such as a carbon fiber, a metal fiber, or the like; a metal powder containing carbon fluoride, aluminum, nickel, or the like; a conductive whisker such as zinc oxide, potassium titanate, or the like; a conductive metal oxide such as titanium oxide or the like; or a conductive material such as a polyphenylene derivative or the like may be used.

For example, the negative electrode active material layer may be formed by applying a negative electrode mixture, which is prepared by dissolving or dispersing a negative electrode active material and, optionally, a binder and a conductive material in a solvent, onto a negative electrode current collector and drying the same, or by laminating, on a negative electrode current collector, a film obtained by casting the negative electrode mixture on a separate support and removing it from the support.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte used in the present invention, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of a lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that may provide lithium ions used in a lithium secondary battery may be used without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. The lithium salt is preferably used at a concentration ranging from 0.1 M to 2.0 M. When the concentration of the lithium salt falls within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included in an amount of 0.1 wt % to 5 wt % with respect to the total weight of the electrolyte.

Since the lithium secondary battery including the positive electrode active material according to the present invention stably exhibits excellent discharge capacity, output characteristics, and lifetime characteristics as described above, it is useful in the field of portable devices such as mobile phones, notebook computers, digital cameras, and the like and electric vehicles such as hybrid electric vehicles (HEVs) and the like.

Accordingly, according to another embodiment of the present invention, a battery module including the lithium secondary battery as a unit cell and a battery pack including the battery module may be provided.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

The type of the lithium secondary battery of the present invention may be, but is not particularly limited to, a cylindrical type using a can, a prismatic type, a pouch type, a coin type, or the like.

The lithium secondary battery according to the present invention may be used not only in a battery cell used as a power source of a small device but also as a unit battery in medium-to-large-sized battery modules including a plurality of battery cells.

Hereinafter, the present invention will be described in detail with reference to examples so that those skilled in the art can easily carry out the present invention. However, the present invention may be embodied in several different forms, and therefore, is not limited to examples described herein.

EXAMPLES AND COMPARATIVE EXAMPLES

Example 1

A positive electrode active material precursor having a composition represented by $Ni_{0.88}Co_{0.05}Mn_{0.07}(OH)_2$ was provided. $LiOH \cdot H_2O$ as a lithium-containing source material and $Al(OH)_3$ as an aluminum-containing source material were provided in amounts such that a molar ratio of the positive electrode active material precursor, $LiOH \cdot H_2O$, and $Al(OH)_3$ was 1:1.05:0.02.

The positive electrode active material precursor, $LiOH \cdot H_2O$ (90 mol % of total number of moles), and $Al(OH)_3$ were mixed and then primarily fired under an oxygen atmosphere in which an oxygen concentration was 85 wt % at 630° C. for 10 hours to prepare a primary firing product cake.

The primary firing product cake was pulverized at 1000 rpm using an ACM pulverizer (Air Classifier Mill) and then classified at 1000 rpm to obtain a pulverized primary firing product.

The pulverized primary firing product was mixed with the $LiOH \cdot H_2O$ (10 mol % of total number of moles) and $ZrO_2$ (in an amount such that a molar ratio of the positive electrode active material precursor and $ZrO_2$ was 1:0.005) and then secondarily fired under an oxygen atmosphere in which an oxygen concentration was 85 wt % at 780° C. for 10 hours to prepare a lithium transition metal oxide having a composition represented by $Li_{1.05}[Ni_{0.86}Co_{0.05}Mn_{0.07}Al_{0.015}Zr_{0.005}]O_2$.

The lithium transition metal oxide and deionized water were mixed in a weight ratio of 1:1, rinsed for 5 minutes, then filtered using a vacuum pump for 10 minutes, and dried in a vacuum oven set at 130° C. for 12 hours or more.

The dried lithium transition metal oxide was mixed with $H_3BO_3$ powder in an amount of 1000 ppm with respect to the weight of the dried lithium transition metal oxide, and the mixture was thermally treated at 300° C. for 10 hours to prepare a positive electrode active material in which a coating layer was formed on the surface of the lithium transition metal oxide.

Example 2

A positive electrode active material precursor having a composition represented by $Ni_{0.88}Co_{0.05}Mn_{0.07}(OH)_2$ was provided. $LiOH \cdot H_2O$ as a lithium-containing source material and $Al(OH)_3$ as an aluminum-containing source material were provided in amounts such that a molar ratio of the positive electrode active material precursor, $LiOH \cdot H_2O$, and $Al(OH)_3$ was 1:1.05:0.02.

The positive electrode active material precursor, $LiOH \cdot H_2O$ (95 mol % of total number of moles), and $Al(OH)_3$ were mixed and then primarily fired under an oxygen atmosphere in which an oxygen concentration was 85 wt % at 630° C. for 10 hours to prepare a primary firing product cake.

The primary firing product cake was pulverized at 1000 rpm using an ACM pulverizer (Air Classifier Mill) and then classified at 1000 rpm to obtain a pulverized primary firing product.

The pulverized primary firing product was mixed with the $LiOH \cdot H_2O$ (5 mol % of total number of moles) and $ZrO_2$ (in an amount such that a molar ratio of the positive electrode active material precursor and $ZrO_2$ was 1:0.005) and then secondarily fired under an oxygen atmosphere in which an oxygen concentration was 85 wt % at 780° C. for 10 hours to prepare a lithium transition metal oxide having a composition represented by $Li_{1.05}[Ni_{0.86}Co_{0.05}Mn_{0.07}Al_{0.015}Zr_{0.005}]O_2$.

The lithium transition metal oxide and deionized water were mixed in a weight ratio of 1:1, rinsed for 5 minutes, then filtered using a vacuum pump for 10 minutes, and dried in a vacuum oven set at 130° C. for 12 hours or more.

The dried lithium transition metal oxide was mixed with $H_3BO_3$ powder in an amount of 1000 ppm with respect to the weight of the dried lithium transition metal oxide, and the mixture was thermally treated at 300° C. for 10 hours to prepare a positive electrode active material in which a coating layer was formed on the surface of the lithium transition metal oxide.

Comparative Example 1

A positive electrode active material precursor having a composition represented by $Ni_{0.88}Co_{0.05}Mn_{0.07}(OH)_2$ was provided.

The positive electrode active material precursor, $LiOH \cdot H_2O$ as a lithium-containing source material, and $Al(OH)_3$ as an aluminum-containing source material were mixed in a molar ratio of 1:1.05:0.02 and then primarily fired under an oxygen atmosphere in which an oxygen concentration was 85 wt % at 780° C. for 30 hours to prepare a primary firing product (lithium transition metal oxide) cake.

The primary firing product cake, that is, the lithium transition metal oxide cake, was pulverized at 1000 rpm using an ACM pulverizer and then classified at 1000 rpm to obtain a pulverized lithium transition metal oxide.

The pulverized lithium transition metal oxide and ionized water were mixed in a weight ratio of 1:1, rinsed for 5 minutes, then filtered using a vacuum pump for 10 minutes, and dried in a vacuum oven set at 130° C. for 12 hours or more.

The dried lithium transition metal oxide was mixed with $H_3BO_3$ powder in an amount of 1000 ppm with respect to the weight of the dried lithium transition metal oxide, and the mixture was thermally treated at 300° C. for 10 hours to prepare a positive electrode active material in which a coating layer was formed on the surface of the lithium transition metal oxide.

Comparative Example 2

A positive electrode active material was prepared in the same manner as in Example 1, except that the positive electrode active material precursor of Example 1, $LiOH \cdot H_2O$ (100 mol % of total number of moles), and $Al(OH)_3$ were mixed, $ZrO_2$ (in an amount such that a molar ratio of the positive electrode active material precursor and $ZrO_2$ was 1:0.005) was additionally mixed therewith, and the mixture was primarily fired under an oxygen atmosphere in which an oxygen concentration was 85 wt % at 630° C. for 10 hours to prepare a primary firing product cake; and the primary firing product cake was pulverized at 1000 rpm using an ACM pulverizer (Air Classifier Mill) and then classified at 1000 rpm to obtain a pulverized primary firing product, and the pulverized primary firing product was secondarily fired under an oxygen atmosphere in which an oxygen concentration was 85 wt % at 780° C. for 10 hours to prepare a lithium transition metal oxide.

Comparative Example 3

A positive electrode active material was prepared in the same manner as in Example 1, except that the pulverized primary firing product was mixed only with $LiOH \cdot H_2O$ (10 mol % of total number of moles) ($ZrO_2$ was not mixed) and then secondarily fired under an oxygen atmosphere in which an oxygen concentration was 85 wt % at 780° C. for 10 hours to prepare a lithium transition metal oxide having a composition represented by $Li_{1.05}[Ni_{0.86}Co_{0.05}Mn_{0.07}Al_{0.02}]O_2$.

Comparative Example 4

The positive electrode active material precursor of Example 1, $LiOH \cdot H_2O$ (90 mol % of total number of moles), and $Al(OH)_3$ were mixed, $ZrO_2$ (in an amount such that a molar ratio of the positive electrode active material precursor and $ZrO_2$ was 1:0.005) was additionally mixed therewith, and the mixture was primarily fired under an oxygen atmosphere in which an oxygen concentration was 85 wt % at 630° C. for 10 hours to prepare a primary firing product cake.

The primary firing product cake was pulverized at 1000 rpm using an ACM pulverizer (Air Classifier Mill) and then classified at 1000 rpm to obtain a pulverized primary firing product.

The pulverized primary firing product was mixed with the $LiOH \cdot H_2O$ (10 mol % of total number of moles) and then secondarily fired under an oxygen atmosphere in which an oxygen concentration was 85 wt % at 780° C. for 10 hours to prepare a lithium transition metal oxide having a composition represented by $Li_{1.05}[Ni_{0.86}Co_{0.05}Mn_{0.07}Al_{0.015}Zr_{0.005}]O_2$.

The lithium transition metal oxide and deionized water were mixed in a weight ratio of 1:1, rinsed for 5 minutes, then filtered using a vacuum pump for 10 minutes, and dried in a vacuum oven set at 130° C. for 12 hours or more.

The dried lithium transition metal oxide was mixed with $H_3BO_3$ powder in an amount of 1000 ppm with respect to the weight of the dried lithium transition metal oxide, and the mixture was thermally treated at 300° C. for 10 hours to prepare a positive electrode active material in which a coating layer was formed on the surface of the lithium transition metal oxide.

EXPERIMENTAL EXAMPLES

Experimental Example 1: Evaluation of Strength of Primary Firing Product Cake

The strength of each of the primary firing product cakes prepared in Examples 1 and 2 and Comparative Examples 1 to 4 was measured by inserting a particle strength tester to a depth of 15 mm from the top of the primary firing product cake, and a maximum value when the primary firing product cake was broken is shown in Table 1.

Experimental Example 2: Evaluation of Pulverization Throughput of Primary Firing Product Cake Each of the primary firing product cakes prepared in Examples 1 and 2 and Comparative Examples 1 to 4 was pulverized at 1000 rpm using an ACM pulverizer and then classified at 1000 rpm, and pulverization throughput thereof is shown in Table 1.

TABLE 1

| | Strength of primary firing product cake (N) | Pulverization throughput (kg/hr) |
|---|---|---|
| Example 1 | 20 | 400 |
| Example 2 | 20 | 40 |
| Comparative Example 1 | 400 | 200 |
| Comparative Example 2 | 20 | 400 |
| Comparative Example 3 | 20 | 400 |
| Comparative Example 4 | 20 | 40 |

Experimental Example 3: Evaluation of Amount of Lithium Remaining on Surface of Positive Electrode Active Material 5 g of each of the positive electrode active materials prepared in Examples 1 and 2 and Comparative Examples 1 to 4 was added to 100 g of deionized water, mixed for 5 minutes, and then filtered. After the filtration, the amount of lithium dissolved in the water was measured by titration using a pH meter, and results thereof are shown in Table 2.

TABLE 2

| | Amount of residual lithium (wt %) |
|---|---|
| Example 1 | 1.0 |
| Example 2 | 0.9 |
| Comparative Example 1 | 1.5 |
| Comparative Example 2 | 1.3 |
| Comparative Example 3 | 1.4 |
| Comparative Example 4 | 1.1 |

Experimental Example 4: Evaluation of Characteristics of Half Cell

The positive electrode active materials prepared in Examples 1 and 2 and Comparative Examples 1 to 4 were used to manufacture lithium secondary batteries, and the initial discharge capacity, initial resistance, and capacity retention rate of the individual lithium secondary batteries were evaluated.

Specifically, each of the positive electrode active materials prepared in Examples 1 and 2 and Comparative Examples 1 to 4, carbon black as a conductive material, and PVdF as a binder were mixed in a weight ratio of 97.5:1.0:1.5 in an NMP solvent to prepare a positive electrode slurry. The positive electrode slurry was applied onto one surface of an aluminum current collector, dried at 130° C., and then roll-pressed to manufacture a positive electrode. Meanwhile, graphite was used as a negative electrode active material. A separator was interposed between the manufactured positive electrode and a negative electrode to manufacture an electrode assembly, the electrode assembly was placed inside an aluminum pouch, and an electrolyte was injected into the pouch to manufacture a lithium secondary battery. In this case, as the electrolyte, an electrolyte prepared by dissolving 0.3 M LiFSI and 0.7 M LiPF$_6$ in an organic solvent containing EC/EMC (3/7, vol %) was used to manufacture a lithium secondary battery.

The manufactured lithium secondary battery was charged at 25° C. at a constant current of 0.1 C up to 4.25 V and then discharged at 0.1 C up to 3.0 V. An initial discharge capacity value is shown in Table 3.

In addition, initial resistance was measured by performing charging at room temperature (25° C.) based on S0050 and then HPPC evaluation at 3 C, and results thereof are shown in Table 3.

In addition, the charging and discharging cycle was repeated 400 times at 45° C. at 0.33 C in a range of 3.0 to 4.25 V, and the capacity of the lithium secondary battery was measured. In this case, a ratio of the 400$^{th}$ cycle capacity to the first cycle capacity was designated as a capacity retention rate, and results thereof are shown in the following Table 3.

TABLE 3

| | Initial discharge capacity (mAh/g) | Initial resistance (mΩ) | Capacity retention rate (%, 400 cycles) |
|---|---|---|---|
| Example 1 | 214 | 1.55 | 68.0 |
| Example 2 | 214 | 1.54 | 67.0 |
| Comparative Example 1 | 212 | 1.55 | 55.0 |
| Comparative Example 2 | 212 | 1.6 | 62.0 |
| Comparative Example 3 | 214 | 1.50 | 57.0 |
| Comparative Example 4 | 212 | 1.59 | 60.0 |

Referring to Table 1, it can be confirmed that the primary firing product cake of Example 1, which was prepared by dividing a firing process into two steps and performing primary firing at a low temperature, had a low strength of 50 N or less, and accordingly, a pulverization process readily proceeded, resulting in substantially high pulverization throughput.

On the other hand, it can be confirmed that the primary firing product cake of Comparative Example 1, which was prepared according to a conventional method, that is, a preparation method including a one-step high-temperature firing process, had a substantially high strength, and accordingly, a pulverization process did not readily proceed, resulting in degraded pulverization throughput.

Referring to Table 2, it can be confirmed that the amount of lithium remaining on the surface of the positive electrode active material of Example 1, which was prepared by dividing a firing process into two steps and performing primary firing at a low temperature, was substantially small such as 1.0 wt % or less.

On the other hand, it can be confirmed that the amount of lithium remaining on the surface of the positive electrode active materials prepared in Comparative Examples 1 and 2 was large. Meanwhile, the reason why the large amount of lithium remains on the surface of the positive electrode active material prepared in Comparative Example 2 is that Zr is added in the primary firing to degrade reactivity of the first lithium-containing source material in Comparative Example 2.

Referring to Table 3, it can be confirmed that the secondary battery including the positive electrode active material prepared in Example 1 exhibited excellent initial discharge capacity and an excellent capacity retention rate compared to the secondary batteries including the positive electrode active materials prepared in Comparative Examples 1 and 2. Also, it can be confirmed that an equivalent level of initial resistance or low initial resistance was also exhibited. In addition, it can be confirmed that the secondary battery including the positive electrode active material prepared in Example 1 exhibited a remarkably excellent capacity retention rate compared to the secondary battery including the positive electrode active material prepared in Comparative Example 3. Additionally, it can be confirmed that the secondary battery including the positive electrode active material prepared in Example 1 exhibited low initial resistance and an excellent capacity retention rate compared to the secondary battery including the positive electrode active material prepared in Comparative Example 4 different only in a ZrO$_2$ addition point from Example 1 (addition prior to primary firing).

Therefore, according to the present invention, it can be seen that the cake strength of a primary firing product can be degraded to allow a pulverization process to readily proceed by dividing a firing process into two steps and performing primary firing at a low temperature, and thus productivity can be improved, and a positive electrode active material having excellent quality can be provided by mixing a doping element M$^1$-containing source material in secondary firing. Also, it can be seen that a positive electrode active material prepared by the method according to the present invention can improve battery performance when applied to a secondary battery.

The invention claimed is:

1. A method of preparing a positive electrode active material, comprising:
   firing a first mixture at 400° C. to 700° C. to prepare a primary firing product, wherein the first mixture has a positive electrode active material precursor represented by the following Chemical Formula 1 or Chemical Formula 2, and a first lithium-containing source material;
   pulverizing the primary firing product;
   firing a second mixture at a temperature above the firing temperature of the first mixture to prepare a lithium transition metal oxide, wherein the second mixture has the pulverized primary firing product, a second lithium-containing source material, and a doping element M$^1$-containing source material,
   wherein the doping element M$^1$-containing source material is added for the first time after the firing of the first mixture and prior to the firing of the second mixture,
   wherein the doping element M$^1$-containing source material contains one or more metal elements selected from among Zr, Mg, Ti, Nb, W, Sc, Si, V, Fe, Y, and Mo:

   [Ni$_a$Co$_b$Mn$_c$](OH)$_2$      [Chemical Formula 1]

   [Ni$_a$Co$_b$Mn$_c$]O·OH      [Chemical Formula 2]

wherein in Chemical Formula 1 and Chemical Formula 2, 0.6≤a<1, 0<b<0.4, 0<c<0.4, and a+b+c=1.

2. The method of claim 1, wherein the first lithium-containing source material and the second lithium-containing source material include one or more selected from the group consisting of lithium hydroxide hydrate (LiOH·H$_2$O), lithium oxide (Li$_2$O), lithium peroxide (Li$_2$O$_2$), and lithium hydroxide anhydrate (LiOH).

3. The method of claim 1, wherein the first lithium-containing source material is used in an amount of 70 mol % to 95 mol % with respect to the total number of moles of the first lithium-containing source material and the second lithium-containing source material.

4. The method of claim 1, wherein the first mixture is fired under an oxygen atmosphere at an oxygen concentration of 80 wt % or more.

5. The method of claim 1, wherein the first mixture is fired for 8 hours to 12 hours.

6. The method of claim 1, wherein the primary firing product has a cake strength of 50 N or less.

7. The method of claim 1, wherein the pulverizing the primary firing product comprises:
   pulverizing the primary fired product using a pulverizer at a rotation speed of 800 rpm to 3000 rpm.

8. The method of claim 1, wherein the second lithium-containing source material is used in an amount of 5 mol % to 30 mol % with respect to the total number of moles of the first lithium-containing source material and the second lithium-containing source material.

9. The method of claim 1, wherein the second mixture is fired at 700° C. to 1000° C.

10. The method of claim 1, wherein the second mixture is fired under an oxygen atmosphere at an oxygen concentration of 80 wt % or more.

11. The method of claim 1, wherein the second mixture is fired for 8 hours to 12 hours.

12. The method of claim 1, further comprising:
   rinsing and drying the lithium transition metal oxide; and
   thermally treating the dried lithium transition metal oxide with a coating element-containing source material a to form a coating layer on the lithium transition metal oxide.

13. The method of claim 1, wherein the first mixture includes an aluminum-containing source material.

* * * * *